United States Patent
Miah

(10) Patent No.: US 7,662,060 B2
(45) Date of Patent: Feb. 16, 2010

(54) RESILIENTLY LOADED SIDE GEARS IN A DIFFERENTIAL MECHANISM

(75) Inventor: Sayid Miah, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 352 days.

(21) Appl. No.: 11/448,939

(22) Filed: Jun. 7, 2006

(65) Prior Publication Data

US 2007/0287569 A1    Dec. 13, 2007

(51) Int. Cl.
*F16H 48/08* (2006.01)

(52) U.S. Cl. ..................................... 475/235

(58) Field of Classification Search ................ 475/235, 475/240; 476/65
See application file for complete search history.

(56) References Cited

U.S. PATENT DOCUMENTS

| | | |
|---|---|---|
| 3,815,443 A | 6/1974 | McAninch et al. |
| 3,896,684 A | 7/1975 | Duer |
| RE29,854 E | 12/1978 | Shealy |
| 4,474,080 A | 10/1984 | Day |
| 4,513,635 A | 4/1985 | Takimura et al. |
| 5,061,089 A * | 10/1991 | Bair et al. .................... 384/535 |
| 5,062,320 A | 11/1991 | Parsons et al. |
| 5,221,238 A | 6/1993 | Bawks et al. |
| 5,461,941 A | 10/1995 | Young |
| 5,624,345 A | 4/1997 | Graft et al. |
| 5,741,199 A | 4/1998 | Tanser et al. |
| 5,984,823 A | 11/1999 | Gage |
| 7,278,948 B2 * | 10/2007 | Credit ........................ 475/235 |

FOREIGN PATENT DOCUMENTS

| | | |
|---|---|---|
| EP | 1717484 | 11/2006 |
| WO | WO2007/101636 | 9/2007 |

* cited by examiner

*Primary Examiner*—Richard M. Lorence
*Assistant Examiner*—Erin D. Bishop
(74) *Attorney, Agent, or Firm*—David B. Kelly; MacMillan, Sobanski & Todd, LLC

(57) ABSTRACT

A differential mechanism includes annular wave springs, each spring located between the back of a side gear and the inner surface of a differential casing. The spring is formed with waves that extend around the spring's circumference and radially across its width, each wave having an amplitude formed of angularly spaced peaks and valleys spaced angularly and located between the peaks. When the mechanism transmits torque, each spring is compressed by a thrust force at the mating teeth of the pinion and side gears, thereby producing a spring force that urges the side gears toward the pinions.

14 Claims, 3 Drawing Sheets

RESILIENTLY LOADED SIDE GEARS IN A DIFFERENTIAL MECHANISM

BACKGROUND OF THE INVENTION

The present invention relates generally to a bevel gear differential mechanism for transmitting rotary power between input pinions and side gears, which are connected to driven vehicle wheels. More particularly, it pertains to reducing driveline clunk due to axle lash.

In a conventional differential mechanism, a pair of side gears and a pair of pinions are installed in a differential casing such that gear teeth on the side gears mesh with gear teeth on the pinions. It is conventional to use a shim selected with a predetermined fit to space the side gears axially away from the inner surface of the casing and axially closer to the pinion gears.

When the operator of a motor vehicle having such a differential tips-in, i.e. rapidly depresses the accelerator pedal from a coasting or braking condition, driveline clunk, a dull objectionable sound is produced, partially due to a condition called rear axle lash. The shim that is used to locate the side gear relative to the pinions often does not position the side gear correctly and permits excessive axial clearance between the side gears and the differential casing. When torque transmitted through the differential is applied abruptly or its directional sense is reversed abruptly, this clearance is closed by an axial thrust force between the adjacent teeth, thereby causing the side gears to impact the casing at relatively high speed and producing the characteristic driveline clunk. Driveline clunk can also occur in a driveline upon shifting an automatic transmission from Park to Drive or Reverse, from Reverse to Drive, and from Drive to Reverse.

There is a need to avoid driveline clunk by correctly, reliably locating the side gears relative to the pinions in the differential casing such that rear axle lash is avoided. Preferably a resilient force can be produced that continually urges the side gears toward the pinions and prevents their impacting the inner surfaces of the casing. In addition, that force should provide damping that would attenuate driveline torque transients.

SUMMARY OF THE INVENTION

According to a preferred embodiment, a differential mechanism for an automotive vehicle includes annular wave springs, each spring located between the back of a side gear and the inner surface of a differential casing. The spring is formed with waves that extend around the spring's circumference and radially across its width, each wave having an amplitude formed of angularly spaced peaks spaced mutually by valleys located between the peaks. When the mechanism transmits torque, each spring is compressed by a thrust force at the mating teeth of the pinion and side gears, thereby producing a spring force that urges the side gears toward the pinions and dampens torsional transients.

Wave springs are used to provide resilient loading of the differential side gears towards the pinions. The wave springs not only reduce rear axle lash, but also provide frictional damping of driveline torque transients.

Among the advantages produced include: reduction of tip-in clunk when accelerating the vehicle abruptly; reduction of static engagement clunk when shifting the drive range of an automatic transmission from Park to Drive or Reverse, from Reverse to Drive, and from Drive to Reverse; elimination of multiple select fit shim parts from the differential assembly; increasing the range of acceptable machining tolerances; and improvement in durability of the differential and rear axle due to the dampened attenuation of torque transients transmitted through the differential.

When the engine throttle is depressed abruptly, an occurrence called "a tip-in," the springs store force in the form of potential energy while they are compressed and release the stored energy when the engine throttle returns to a neutral position. This energy storage and release, in combination with the dissipation of energy due to friction contact among the springs, side gears, and surfaces of the differential case modulate torsional transients in the differential assembly and rear axle.

The scope of applicability of the present invention will become apparent from the following detailed description, claims, and drawings. It should be understood, that the description and specific examples, although indicating preferred embodiments of the invention, are given by way of illustration only. Various changes and modifications to the described embodiments and examples within the spirit and scope of the invention will become apparent to those skilled in the art.

DESCRIPTION OF THE DRAWINGS

These and other advantages of the present invention will become readily apparent to those skilled in the art from the following detailed description of a preferred embodiment when considered in the light of the accompanying drawings in which.

DESCRIPTION OF THE PREFERRED EMBODIMENT

Figure 1:
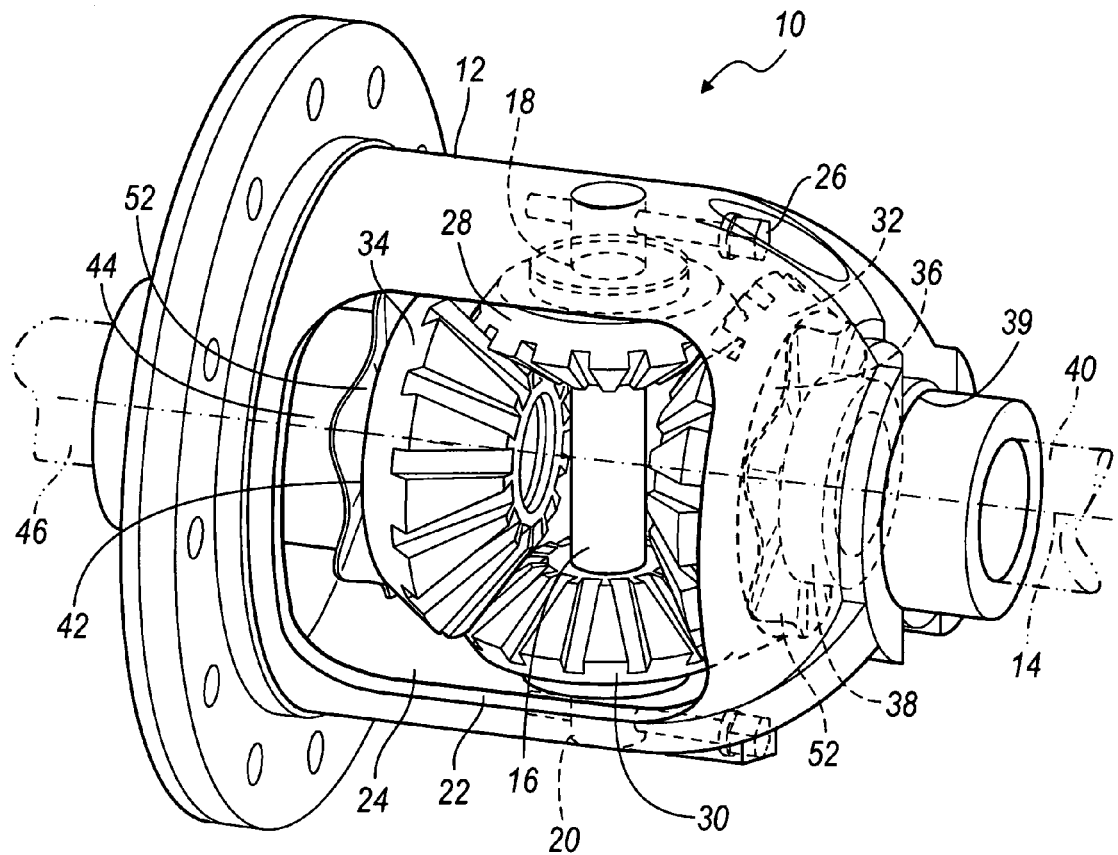
FIG. 1 is a partial cross section taken through a differential casing showing the internal components of a differential mechanism including the wave springs.
Figure 2:
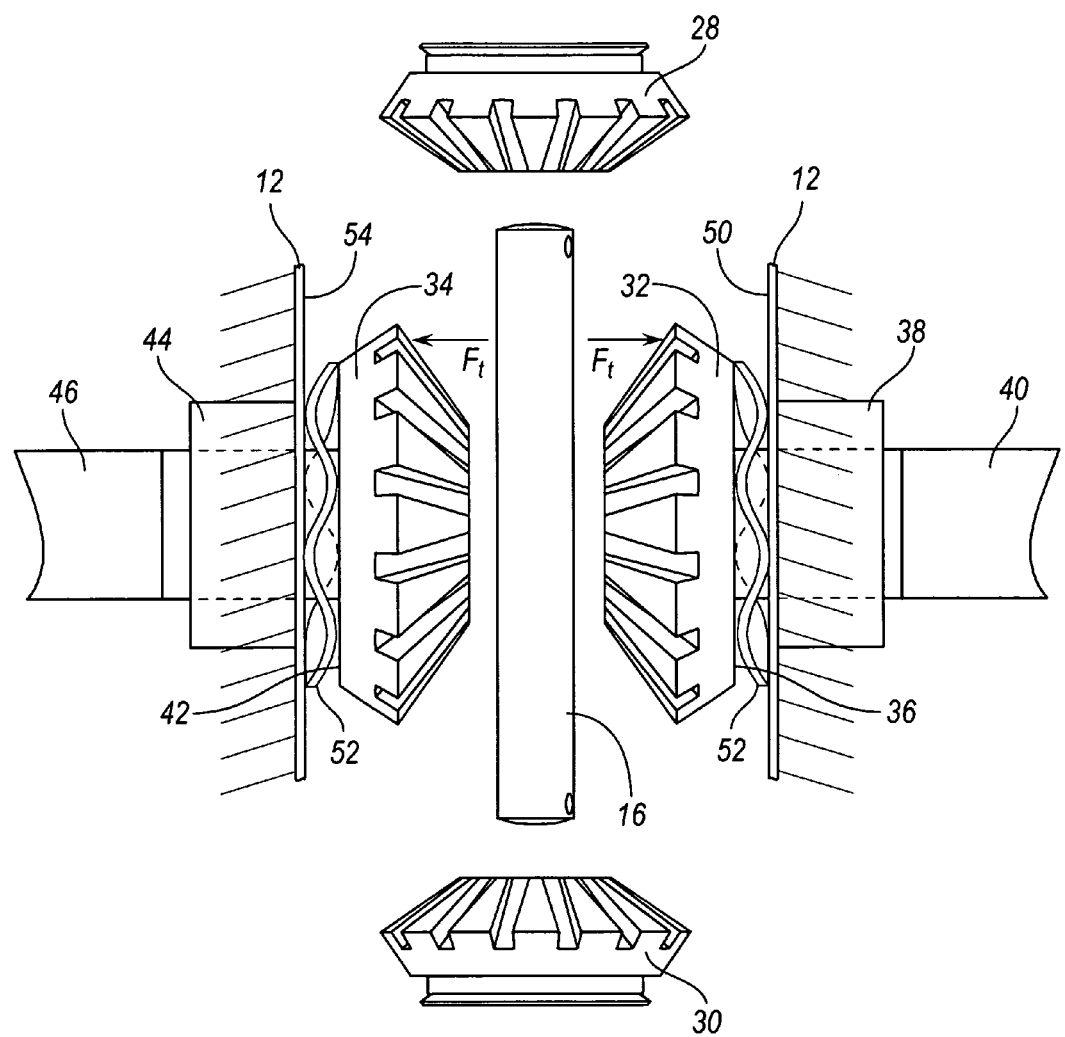
FIG. 2 is a schematic diagram showing the side gears, pinions and wave springs.
Figure 4:
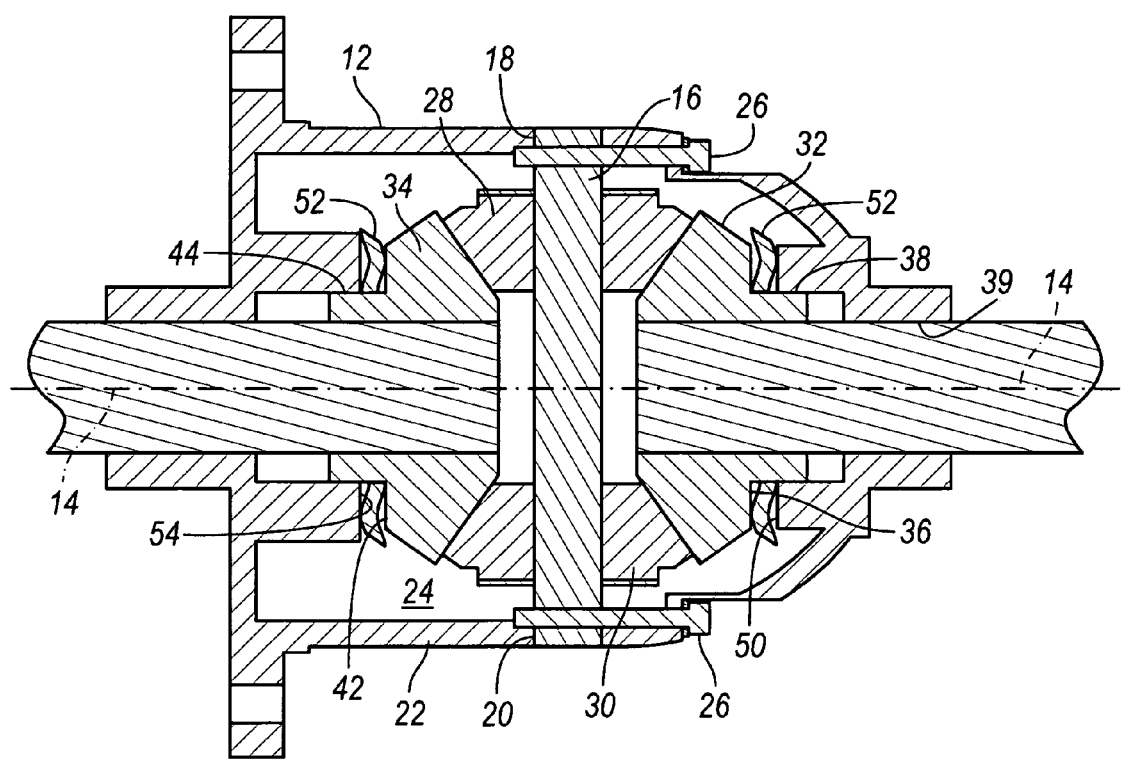
FIG. 4 is a cross section through the differential assembly.

Referring now to FIGS. 1 and 2, a differential mechanism 10 includes a differential casing 12, which is supported for rotation about an axis that extends laterally toward the left and right wheels of a driven wheel set for an automotive vehicle. The casing 12 is driveably connected to a driveshaft that extends along the longitudinal axis of the vehicle from a transmission output (not shown).

A pinion shaft 16 extends through cylindrical openings 18, 20 in the walls 22 of the casing and through a space 24 enclosed by the casing. The pinion shaft 16 is secured by a bolt 26 to the casing 12 and is supported on the casing at the cylindrical openings 18, 20 at opposite ends of the pinion shaft. Therefore, the pinion shaft rotates about axis 14 as the casing rotates. Two pinions 28, 30, each formed with bevel gear teeth, are secured to the pinion shaft 16.

Two side gears 32, 34, each formed with bevel gear teeth, which are in meshing engagement with the teeth of the pinions 28, 30, are located in the casing 12. Side gear 32 includes an axial surface 36, facing laterally away from the pinion shaft 16. Side gear 32 also includes a hollow cylindrical sleeve portion 38 that extends laterally toward an opening 39 in the casing, through which a side shaft 40 extends from its connection at side gear 32 to the right-side wheel of the vehicle. Similarly, at the left side of the differential 10, side gear 34 includes an axial surface 42, facing laterally away from the pinion shaft 16, and a hollow cylindrical sleeve portion 44 that extends laterally toward an opening in the casing, through which a side shaft 46 extends from its connection at the side gear 34 to the left-side wheel of the vehicle.

Figure 3:
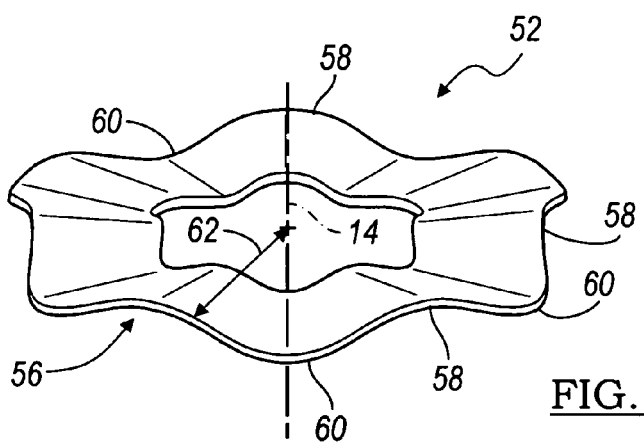
FIG. 3 is isometric view of a wave spring for use in the differential mechanism of FIG. 1.

The inner surface of casing 12 is formed with an axial surface 50, which is substantially parallel to and faces axial face 36 of side gear 32. An annular wave spring 52, such as that illustrated in FIG. 3, is located between the axial face 36 of side gear 32 and the axial surface 50 of the casing 12.

The inner surface of casing 12 is also formed with an axial surface 54, which is substantially parallel to and faces the axial face 42 of side gear 32. Similarly, at the left side of the differential 10, an annular wave spring 52 is located between the axial face 42 of side gear 34 and the axial surface 54 of the casing 12.

The wave spring 52 is preferably annular, of spring steel and having multiple waves 56 formed with alternating peaks 58 and valleys 60 between the peaks, each wave having an amplitude. The spring 52 includes a width 62 that extends radially from axis 14. The peaks 58 on one axial side of the spring 52 contact the axial surface 50, 54 on the inner surface of the casing 12; the valleys 60 on the opposite axial side of the spring 52 contact an axial face 36, 42 on the respective side gear 32, 34.

As illustrated in FIG. 2, torque is transmitted between the pinions 28, 30 and side gears 32, 34 by a force at the area of contact on the faces of the meshing gears and pinions. That force has a thrust component $F_t$ parallel to axis 14 and directed axially outboard toward the wave springs 52. The thrust components of the force compress the wave springs 52 against the axial surfaces 50, 54, producing a resilient force that urges the side gears 32, 34 axially inboard toward the pinions 28, 30 and pinion shaft 16. The resilient force reduces the clearance between the meshing teeth, reduces lash, thereby modulating driveline clunk.

When torque is transmitted through the differential 10, the side gears 32, 34 can rotate about axis 14 relative to the wave springs 52 with the peaks 58 and valleys 60 of the springs in frictional contact with faces 36, 42 and surfaces 50, 54 due to the presence of the resilient force of the springs 52. The frictional contact and relative motion produce damping at the contacting surface on the peaks 58, valleys 60, surfaces 50, 54 and gear faces 36, 42. The damping that is produced there, called Coulomb damping, attenuates torsional transients being transmitted through the differential 10. When the engine throttle is depressed abruptly during a tip-in, the springs 52 store force in the form of potential energy while they are compressed and release the stored energy when the engine throttle returns to a neutral position. This energy storage and release, in combination with the dissipation of energy due to friction contact among the springs 52, side gears 32, 34, and case surfaces 50, 54 modulate torsional transients in the rear axle.

The side gears 32, 34 are installed in the differential casing 16 with the wave springs 52 located between the face 36, 42 of each side gear 32, 34 and the inner surface 50, 54 of the differential casing. Then the pinions 28, 30 are installed in meshing engagement with the side gears 32, 34. The wave springs 52 are in a free state when installed, are not compressed, and produce no resilient force. This facilitates installation of the pinions in mesh with the side gears. Finally, the pinion shaft 16 is inserted into the central apertures 18, 20 of casing 12 and through the pinions 28, 30 from the outside of the differential casing 16.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A differential mechanism comprising:
   a casing including a first surface and a second surface
   a first side gear including a first back facing the first surface;
   a second side gear including a second back facing the second surface;
   pinions meshing with the first and second side gears;
   a first spring located between the first surface and the first back; and
   a second spring located between the second surface and the second back, each spring operating in the mechanism in a free state that produces no resilient force on the side gears and in a loaded state that urges the side gears toward the pinions only when the mechanism transmits torque.

2. The differential mechanism of claim 1 wherein:
   each of the first and second side gears is formed with a cylindrical outer surface extending lateral along the axis and located in the casing; and
   the first and second springs are annular wave springs, each spring being fitted over the cylindrical surface of the respective side gear.

3. The differential mechanism of claim 1 wherein each spring is formed of spring steel.

4. The differential mechanism of claim 1 wherein:
   the side gears and pinions include bevel gear teeth; and
   each spring includes an axial thickness dimension that varies with a magnitude of an axial component of a force that transmits torque between a side gear and a respective pinion, said dimension being unchanged by installation and assembly of the pinions in the casing.

5. The differential mechanism of claim 1 wherein each spring includes multiple waves that extend about an axis and an amplitude that varies along a circumference of the spring.

6. The differential mechanism of claim 1 wherein each spring produces a resilient force that urges a respective side gear inboard toward the pinions in response to a transmission of torque between the pinions and the side gears.

7. The differential mechanism of claim 1 wherein the side gears rotate relative to the pinions when the differential mechanism transmits torque.

8. A differential mechanism comprising:
   a casing including a first surface and a second surface;
   a first side gear including a first back facing the first surface;
   a second side gear including a second back facing the second surface;
   pinions meshing with the first and second side gears, each pinion rotating in the mechanism without a select fit shim between a casing surface and the pinion;
   a first spring located between the first surface and the first back; and
   a second spring located between the second surface and the second back, the springs producing no resilient force on the side gears after the pinions are installed in the casing.

9. The differential mechanism of claim 8 wherein:
   each of the first and second side gears is formed with a cylindrical outer surface extending lateral along the axis; and
   the first and second springs are annular wave springs, each spring encircling the cylindrical surface of the respective side gear.

10. The differential mechanism of claim 8 wherein each spring is formed of spring steel.

11. The differential mechanism of claim 8 wherein:
the side gears and pinions include bevel gear teeth; and
each spring includes an axial thickness dimension that varies with a magnitude of an axial component of a force that transmits torque between a side gear and a respective pinion.

12. The differential mechanism of claim 8 wherein each spring includes multiple waves that extend about an axis and an amplitude that varies along a circumference of the spring.

13. The differential mechanism of claim 8 wherein each spring produces a resilient force that urges a respective side gear inboard toward the pinions in response to a transmission of torque between the pinions and side gears.

14. The differential mechanism of claim 8 wherein the pinions rotate relative to the side gears when the differential mechanism transmits torque.

* * * * *